June 7, 1938.    R. H. SMITH    2,120,193
FURROW OBSTRUCTING MACHINE
Original Filed Aug. 15, 1936    2 Sheets-Sheet 1
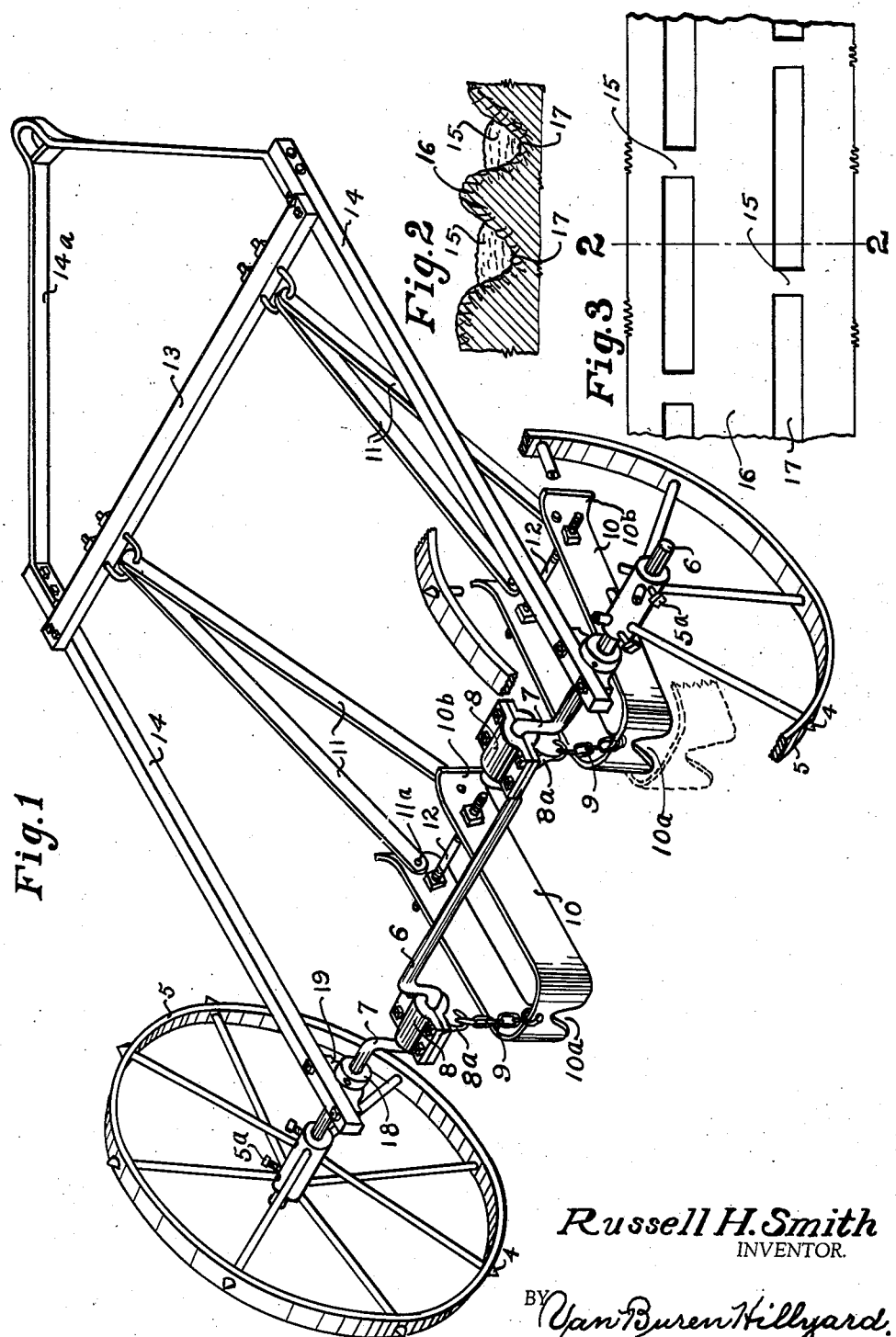
Russell H. Smith
INVENTOR.
BY Van Buren Hillyard
ATTORNEY.

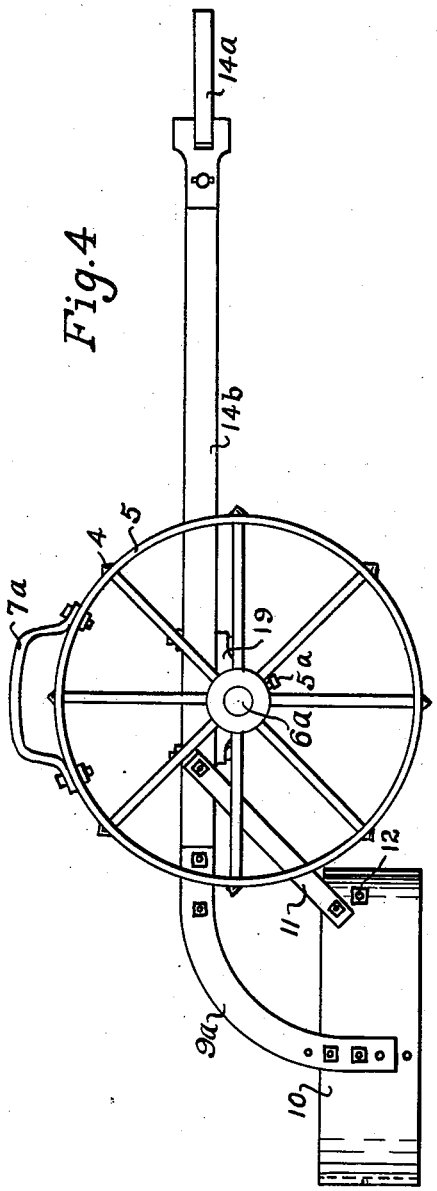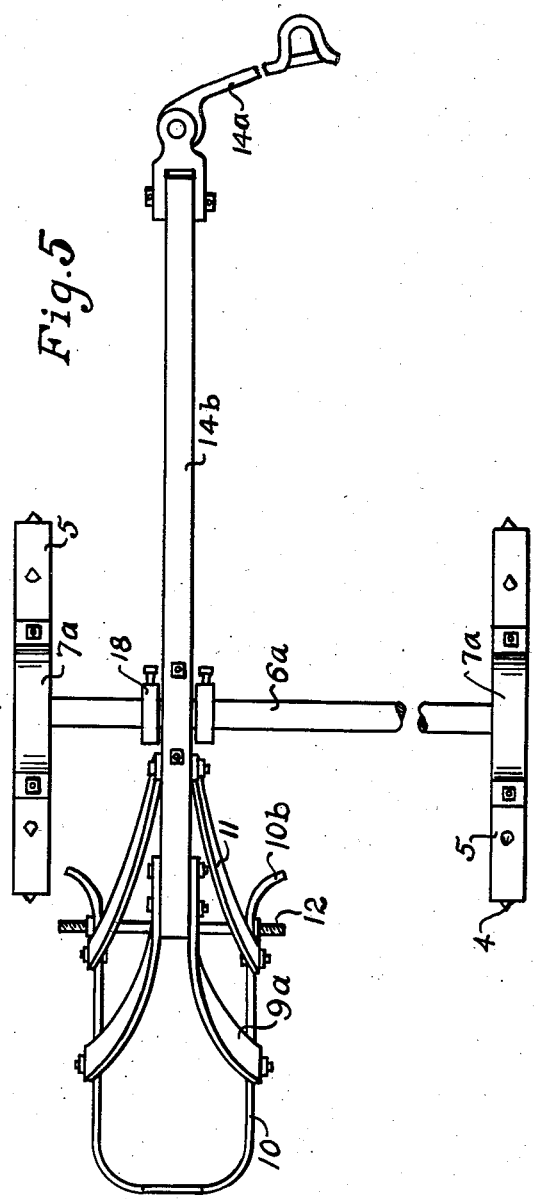

Patented June 7, 1938

2,120,193

UNITED STATES PATENT OFFICE 2,120,193

FURROW OBSTRUCTING MACHINE

Russell H. Smith, Quanah, Tex.

Application August 15, 1936, Serial No. 96,275
Renewed October 8, 1937

16 Claims. (Cl. 97—55)

This invention relates to improvements in furrow damming machines to obstruct the flow of water in furrows, thereby obviating the washing away of top soil by providing a means for trapping the water in basins. The basins thus formed permit the maximum absorption for the benefit of seed germination and plant life.

An object of this invention is to provide a machine that will dam furrows at predetermined intervals, thus forming water basins for the retention of moisture.

Another object of the invention is to provide a machine that will follow behind a planter and not disturb the seed in the drill.

A still further object of the invention is the provision of a machine that is adjustable, so that the amount of soil deposited in each dam may be varied.

Still another object of the invention is the provision of a machine that is simple in operation, easy to construct, and inexpensive to manufacture.

With the foregoing objects in mind and others that will become apparent as the description proceeds, reference is to be had to the drawings which illustrate a preferred embodiment of the invention, but it is to be understood that in adapting the same to meet specific needs and requirements, the design may be varied and changes in the minor details of construction resorted to within the scope of the invention as claimed without departing from the spirit thereof.

For a full understanding of the invention and the merits thereof, reference is to be had to the following description and the drawings hereto attached in which:

Figure 1 is a perspective view illustrative of an embodiment of the invention, parts being broken away.

Figure 2 is a sectional detail on the line 2—2 of Figure 3.

Figure 3 is a diagrammatic view of the furrows and dams formed therein by the machine.

Figure 4 is a side elevation of a modification.

Figure 5 is a plan view of the modification.

With more detailed reference to the drawings, in which like parts are designated by like reference characters, the numeral 5 represents the ground wheels of a suitable supporting frame including an axle or shaft 6. These wheels have tractor lugs 4 and are preferably secured to the axle 6 by set screws 5a. The axle 6 has crank portions 7 upon which are mounted bearings 8. The frame of the machine includes side bars 14, cross bar 13 and a draw bar 14a. Drags are connected to the cross bar 13 and to the bearings 8 by adjustable connections 9 such as chains. Each of the drags consists of a pair of links 11 and a scraper 10 of substantially U-shape having an inverted V-shaped cutaway portion or notch 10a in its closed rear end to clear the seed in the furrow. The free ends of the scraper flare, as shown at 10b, to remove the soil from the sides of the furrow and deposit the same at intervals therein in the formation of the dams. The width of the scraper is adjustable by means of a rod 12 having its ends secured by nuts thereon to the side members of the scraper. This provides adjustment of the width of the scraper to accommodate various widths of furrows.

In the diagram and sectional view thereof (Figs. 3 and 2, respectively) the numeral 17 represents the furrows and the numeral 15 the dams obstructing the flow and forming depressions or basins to catch and hold moisture for irrigation.

There will be provided a drag or scraper for each furrow and means, such as the crank 7, for intermittently operating the scraper as the machine is advanced over the field. The scraper when lowered engages the soil at the sides of the furrow and moves it across the furrow to form a dam. If seed has been planted in the furrow, it will not be disturbed by this scraping action because of the clearance provided by the cutaway portion or notch 10a. When the scraper is lifted it clears the dam which is left intact. The dams thus formed result in the formation of depressions or basins to catch and hold moisture which is slowly absorbed instead of running off and washing away the top soil. Thus the crop is able to withstand longer periods of dry weather, than the crops in fields where such dam forming is not practiced.

It is to be noted that both wind and water erosion are largely overcome by the use of this dam forming device. The plant life, by the retention of moisture, is encouraged, and vegetation is the best protection to the top soil. The retention of moisture also prevents wind erosion, as damp soil does not blow away so readily as does dry, powder like soil. The dams formed prevent water erosion by holding the water long enough for it to be absorbed into the soil instead of being washed away, forming gullies and washes, and taking the light top soil away in the process. Furthermore the top soil is held in combination with the heavier earth instead of being washed and separated out and deposited at the surface to be blown away by the wind. As the top soil is the most fertile part of the soil, its conservation is highly important in agriculture.

The modification shows a straight axle 6a that has ground wheels 5 mounted thereupon. A bracket, lug or tappet 7a is provided upon the outer periphery or rim of each wheel 5, preferably in transverse alignment as shown in Fig. 5. As the wheels roll over the ground the brackets 7a cause an intermittent lifting of frame 14b carrying scraper 10. The scraper 10 is adjustably connected to the frame 14b by connecting members 9a such as straps.

Set collars 18 are provided on shaft 6a to hold frame member 14b in desired adjusted transverse position. Bearings 19 are provided to journal shaft 6a on the frame member 14b. One unit is shown in Figure 5 but it is to be understood that a multiplicity of units may be mounted on the shaft as desired.

Having thus described the invention, what is claimed is:

1. A machine for obstructing furrows to provide water retaining depressions, the same comprising a substantially U-shaped scraper with sides approximately in parallel planes extending at an angle to the plane of the closed end thereof and having a cutaway portion in its closed end to clear seed deposited in the furrow, and draft means for the scraper attached to the free end portions of the sides thereof.

2. A machine for obstructing furrows to provide water retaining depressions, the same comprising a substantially U-shaped scraper having a cutaway portion in its closed end to clear the seed deposited in the furrow, and having the free ends of the side members flared to engage and remove soil from the sides of the furrow, and draft means for the scraper attached to the free end portions of the sides thereof.

3. A machine for obstructing furrows to provide water retaining depressions, the same comprising a substantially U-shaped scraper having a cutaway portion in its closed end to clear the seed deposited in the furrow, and having the free ends of the side members flared to engage and remove soil from the sides of the furrow, and means for laterally adjusting the flared ends of the scraper.

4. A machine for obstructing furrows to provide water retaining depressions, the same comprising a wheel frame, U-shaped scrapers, links connecting the scrapers with the frame, eccentric portions connected with the wheels of the frame to be driven thereby, and adjustable connections between the scrapers and the said eccentric portions.

5. A machine for obstructing furrows to provide water retaining depressions, the same comprising a wheel frame, U-shaped scrapers having their closed ends cut away to provide seed clearance and having their free ends flared and adjustably connected, links connecting the scrapers with the frame, and operating means for intermittently raising and lowering the scrapers.

6. A scraper of U-form having a portion of the closed end cutaway to provide clearance for the seed and having the free ends flared, and means for adjustably connecting the said flared ends.

7. A scraper of U-form having approximately parallel sides with flared free ends and constructed for adjustment of said sides toward and from each other, and means for adjustably connecting said sides together for relative lateral adjustment.

8. A scraper of approximately U-form having approximately parallel sides and a portion of the closed end cut away to provide clearance for seed.

9. A scraper comprising a U-shaped portion with the sides in approximately parallel planes extending at an angle to the plane of the closed end and having an inverted V-shaped notch in the lower edge thereof to prevent disturbance of seed.

10. A scraper comprising a U-shaped portion with the sides in approximately parallel planes extending at angle to the plane of the closed end and having an inverted V-shaped cut away notch in the lower scraping edge of the closed end thereof to provide clearance for seed.

11. In a machine for building dams in furrows, the combination of a wheeled frame, a scraper connected therewith, and means for automatically raising and lowering said scraper at intervals to form dams in a furrow, said scraper having a notch in the lower edge portion thereof to provide clearance for seed.

12. In a machine for building dams in furrows, the combination of a wheeled frame, a substantially U-shaped scraper connected with the frame, said scraper having a forwardly directed open end and a rearward closed end, and means for automatically raising and lowering said scraper at intervals to form dams in a furrow.

13. In a machine for building dams in furrows, the combination of a wheeled frame, and a substantially U-shaped scraper connected with the frame, said scraper having a forwardly directed open end and a rearward closed end, said wheeled frame including a wheel having a peripheral offset for raising and lowering said scraper to form dams in a furrow.

14. In a machine for building dams in furrows, the combination of a frame carrying a scraper, and a wheel supporting said frame, said wheel having a rim with a peripheral offset thereon for raising and lowering said scraper.

15. In a machine for building dams in furrows, the combination of a frame carrying a scraper, and a wheel supporting said frame, said wheel having a bracket attached to the periphery thereof for raising and lowering said scraper.

16. In a machine for building dams in furrows, the combination of a frame carrying a scraper, and wheels supporting said frame, each wheel having an annular rim carrying a peripheral bracket for raising and lowering said scraper.

RUSSELL H. SMITH.